(12) United States Patent
Yamaguchi et al.

(10) Patent No.: US 8,843,976 B2
(45) Date of Patent: Sep. 23, 2014

(54) VIDEO SERVER AND VIDEO DATA TRANSMISSION METHOD

(75) Inventors: Shuichi Yamaguchi, Kunitachi (JP); Toshio Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 13/220,961

(22) Filed: Aug. 30, 2011

(65) Prior Publication Data

US 2012/0124634 A1    May 17, 2012

(30) Foreign Application Priority Data

Nov. 16, 2010  (JP) .................................. 2010-256102

(51) Int. Cl.
*H04N 7/173* (2011.01)
*H04N 21/218* (2011.01)
*H04N 21/231* (2011.01)

(52) U.S. Cl.
CPC ..... *H04N 21/21825* (2013.01); *H04N 21/2181* (2013.01); *H04N 21/23103* (2013.01)
USPC .................................. 725/92; 725/93; 725/96

(58) Field of Classification Search
CPC .............................................. H04N 21/23106
USPC ......... 725/86, 91, 92, 93, 94, 95, 96, 97, 105, 725/114, 115, 116, 117; 386/326, 328
See application file for complete search history.

(56) References Cited

U.S. PATENT DOCUMENTS

| | | | | |
|---|---|---|---|---|
| 5,530,557 A | * | 6/1996 | Asit et al. ....................... | 386/206 |
| 7,594,250 B2 | * | 9/2009 | Debey ........................... | 725/103 |
| 7,908,628 B2 | * | 3/2011 | Swart et al. ..................... | 725/93 |
| 2006/0093325 A1 | * | 5/2006 | Imai et al. ........................ | 386/83 |
| 2007/0245387 A1 | * | 10/2007 | Singh et al. ..................... | 725/81 |
| 2008/0306962 A1 | * | 12/2008 | Grannan et al. ................ | 707/10 |
| 2011/0122320 A1 | | 5/2011 | Yamaguchi et al. | |

FOREIGN PATENT DOCUMENTS

| | | |
|---|---|---|
| JP | 10-283726 A | 10/1998 |
| JP | 2000-231776 A | 8/2000 |
| JP | 2002-055878 A | 2/2002 |
| JP | 2007-49557 | 2/2007 |

(Continued)

OTHER PUBLICATIONS

Notice of Rejection mailed by Japan Patent Office on Nov. 13, 2012 in the corresponding JP Patent Application No. 2010-256102.

(Continued)

*Primary Examiner* — John Schnurr
(74) *Attorney, Agent, or Firm* — Knobbe, Martens, Olson & Bear, LLP

(57) ABSTRACT

According to one embodiment, a video server includes an encoder, a transmission module, storage modules, and a controller. The encoder outputs a request in response to encoding a video signal. The controller confirms whether or not the number of outputs of video data and a video file to the storage modules within a time interval is less than a limitation number in response to the request. The controller selects the best storage module to store the encoded video data from among the storage modules if the number of outputs is less than the limitation number. The apparatus controller transmits an instruction to the encoder designating the selected storage module as a transmission destination. The encoder outputs the encoded video data designating the transmission destination. The transmission module transmits the output video data to the transmission destination. The storage modules designated as the transmission destination stores the transmitted video data.

11 Claims, 9 Drawing Sheets

(56) References Cited

FOREIGN PATENT DOCUMENTS

| JP | 2007-257362 A | 4/2007 |
|----|---------------|--------|
| JP | 2007-280068 A | 10/2007 |
| KR | 10-1998-0042529 | 8/1998 |
| KR | 10-0747080 | 8/2007 |

OTHER PUBLICATIONS

Office Action mailed by Korea Patent Office on Apr. 2, 2013 in a corresponding Korean patent application No. 10-2011-0091789.

* cited by examiner

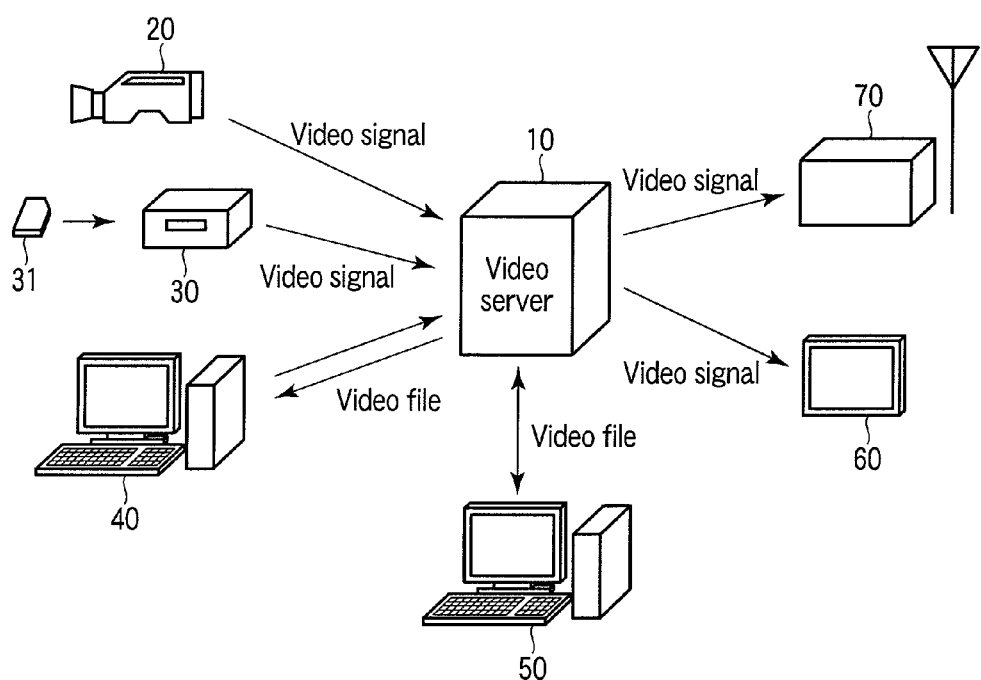
F I G. 1

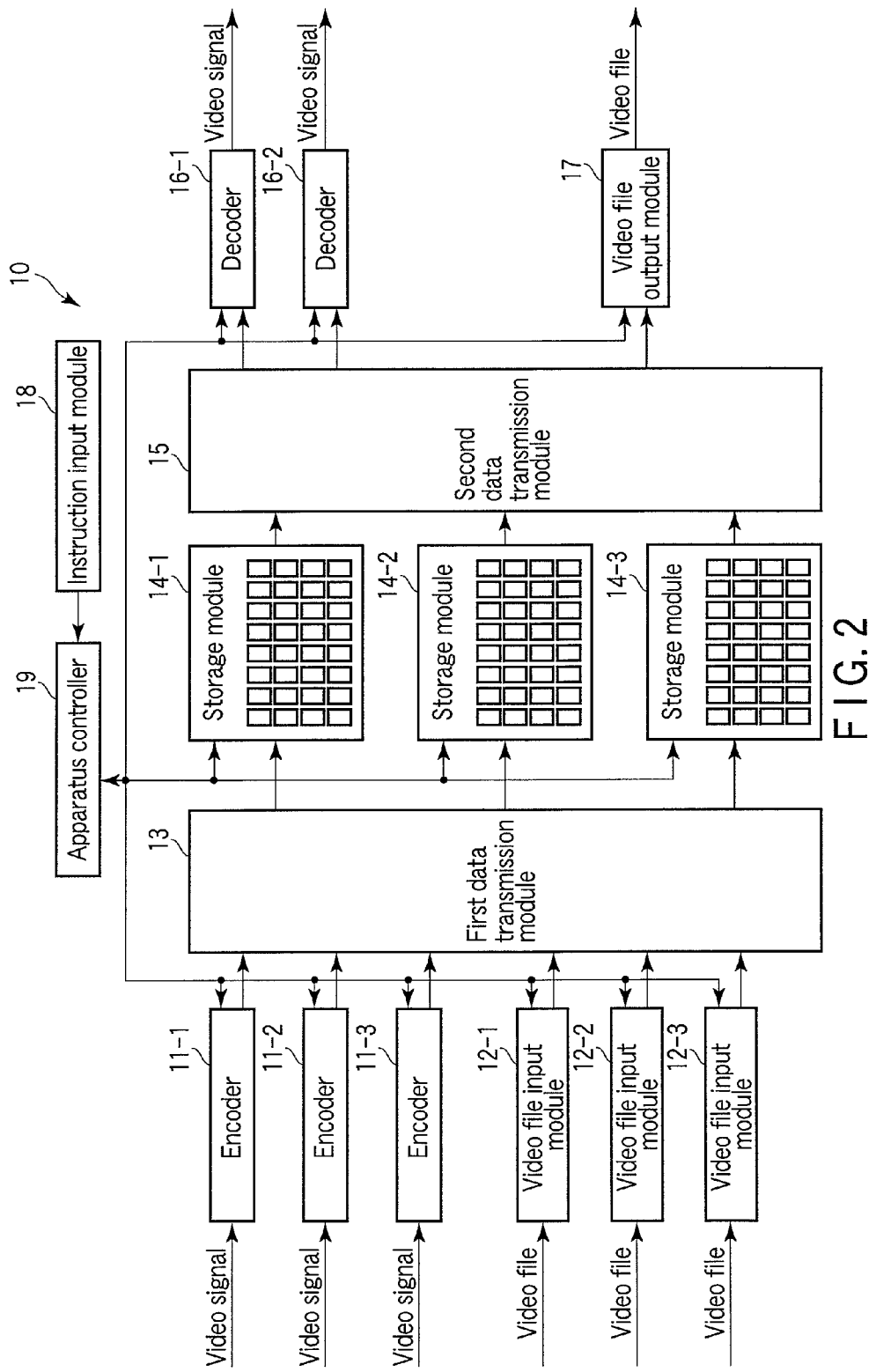
F I G. 2

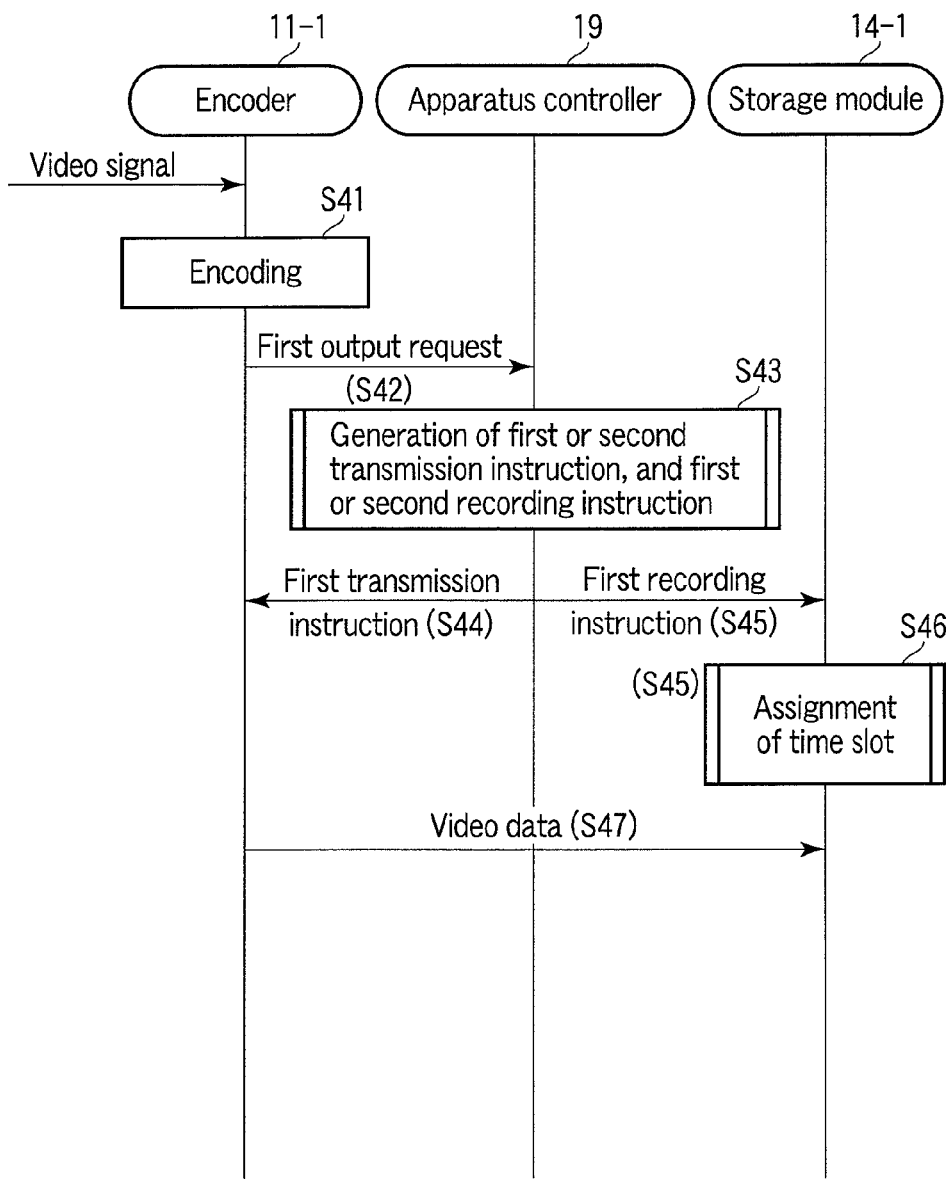
F I G. 4

Issuance number counter

| Path | Issuance number |
|---|---|
| 1 | 5 |

FIG. 6

Management table

| Storage module number | Residual capacity (MB) | Time slot remaining number |
|---|---|---|
| 14-1 | 200 | 43 |
| 14-2 | 145 | 50 |
| 14-3 | 55 | 50 |
|  |  |  |

FIG. 7

| Item | Data example |
|---|---|
| Data transmission source | 101 |
| Data transmission destination | 401 |
| Management number | 4010001 |
| Classification | 100 |

FIG. 8

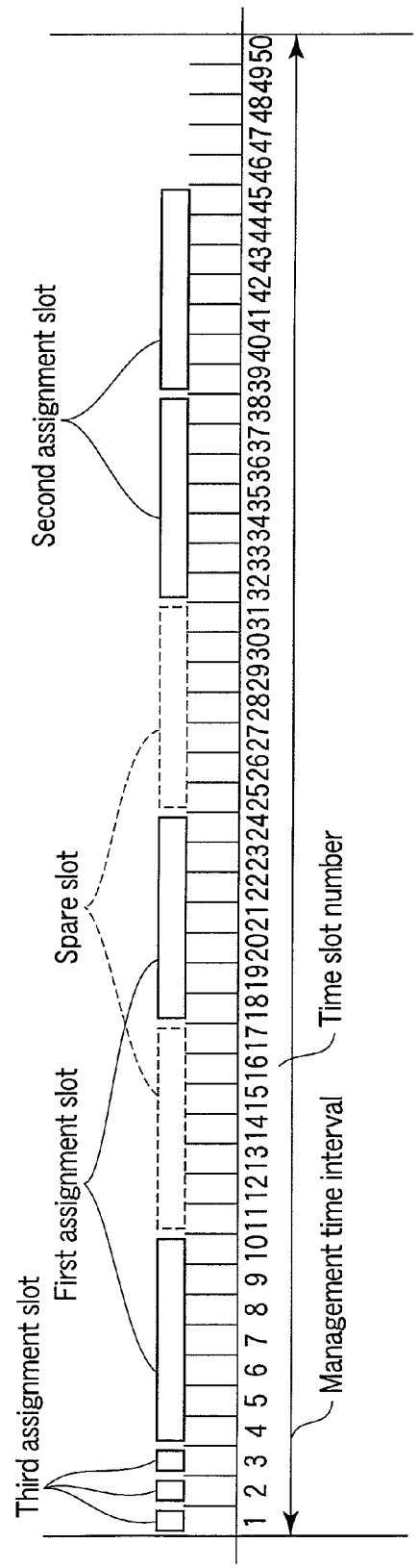
F I G. 10

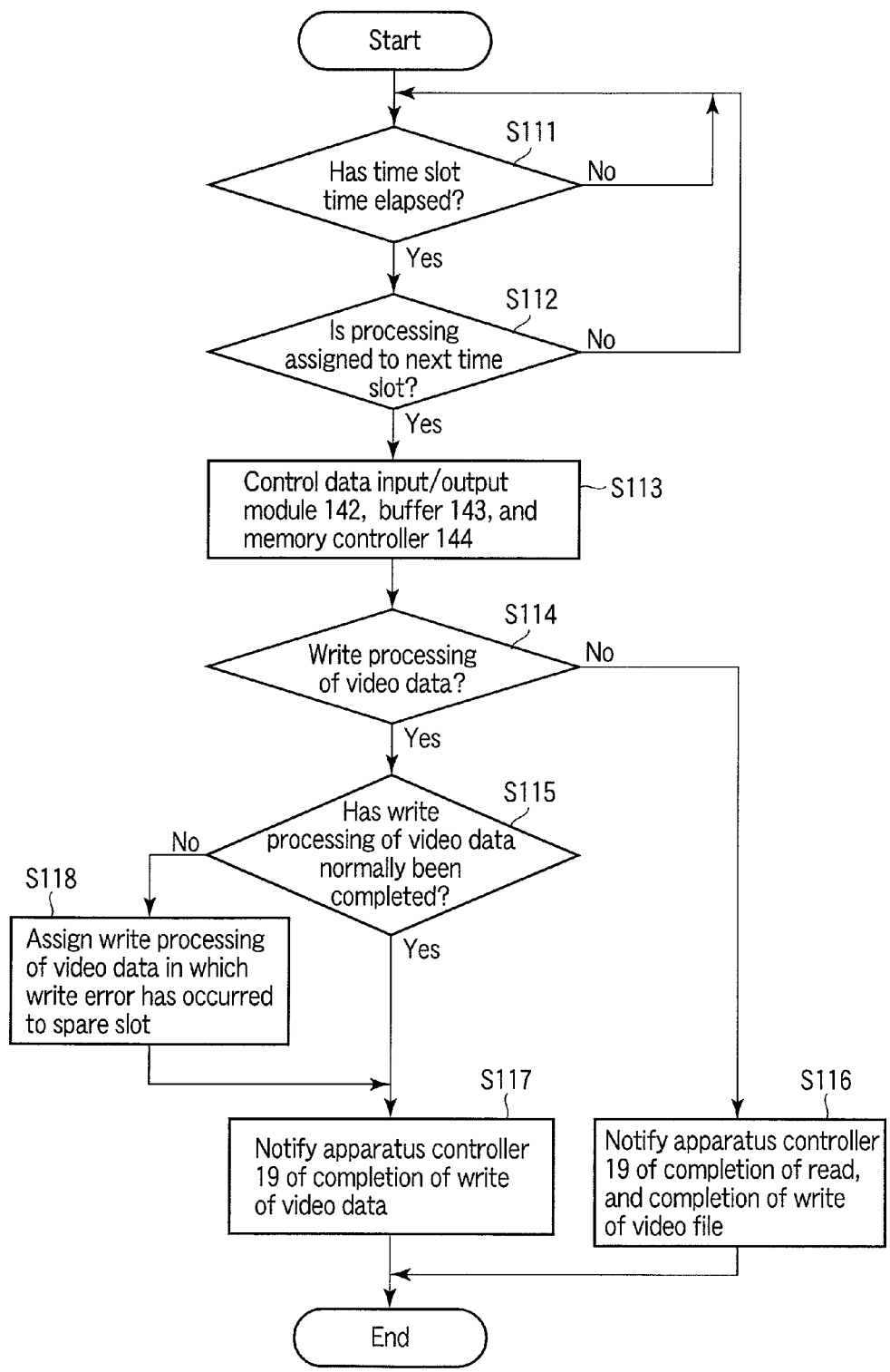
F I G. 11

VIDEO SERVER AND VIDEO DATA TRANSMISSION METHOD

CROSS-REFERENCE TO RELATED APPLICATIONS

This application is based upon and claims the benefit of priority from prior Japanese Patent Application No. 2010-256102, filed Nov. 16, 2010, the entire contents of which are incorporated herein by reference.

FIELD

Embodiments described herein relate generally to a video server and video data transmission method.

BACKGROUND

A video server encodes a video signal acquired by a video camera or the like into video data, and accumulates the video data in a storage module including a semiconductor memory. The video server decodes the accumulated video data, and outputs the decoded video data as a video signal. The output video signal is used for broadcasting and video confirmation prior to broadcasting.

As described above, in the conventional video server, it has been common that a video signal is input from outside, and the input video signal is internally encoded. However, in recent years, input/output of a video file in a file format is also required.

In order to meet the requirement, the general-purpose Ethernet (registered trade name) switch may be used in a video server to input a video signal and a video file. However, network congestion might be caused in the video server including the Ethernet switch when a massive amount of video data or a large number of video files are transmitted. Further, as the video server includes a plurality of storage modules, it is also necessary to make it possible to sufficiently utilize the processing performance of the storage modules.

BRIEF DESCRIPTION OF THE DRAWINGS

FIG. 1 is a configuration view of a video transmission system provided with a video server according to this embodiment.

FIG. 2 is a block diagram showing the functional configuration of the video server in FIG. 1.

FIG. 4 is a sequence diagram of a case where the encoder in FIG. 2 transmits video data to the storage module.

FIG. 6 is a view showing an issuance number counter to be recorded by the apparatus controller of FIG. 2.

FIG. 7 is a view showing a management table indicating the residual capacity and time slot remaining number of each of the storage modules in FIG. 2.

FIG. 8 is a view showing the first transmission instruction and first recording instruction generated by the apparatus controller in FIG. 2.

FIG. 10 is a view of a case where the management controller in FIG. 3 assigns time slots.

FIG. 11 is a flowchart of a case where the management controller in FIG. 3 operates in accordance with the time slots.

DETAILED DESCRIPTION

Figure 3:
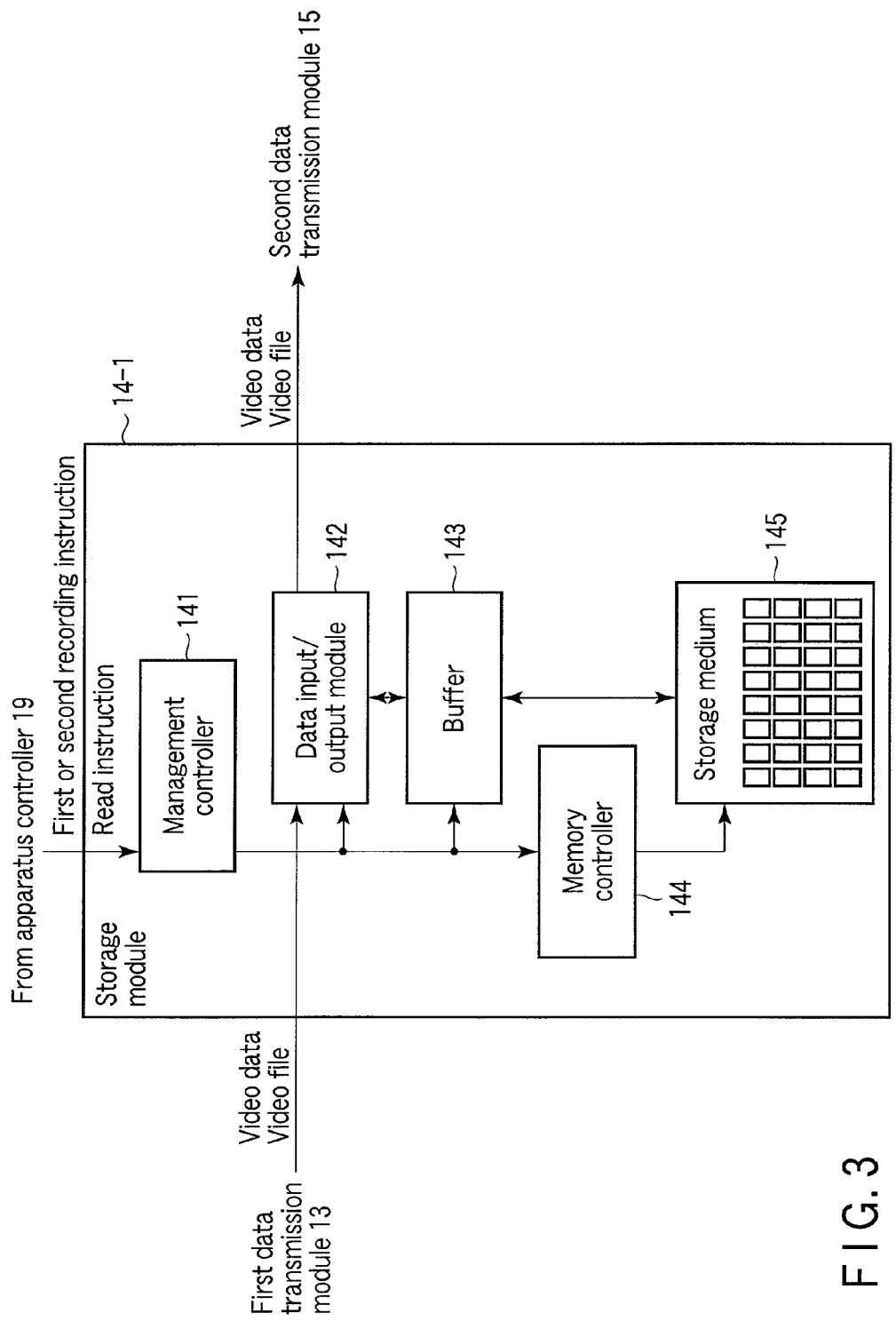
FIG. 3 is a block diagram showing the functional configuration of the storage module in FIG. 2.

In general, according to one embodiment, a video server includes an encoder, a video file input module, a data transmission module, storage modules, and an apparatus controller. The encoder encodes a video signal into video data, outputs a first output request in response to the video signal, and outputs the video data designating a first transmission destination determined based on a first transmission instruction. The first transmission instruction is supplied based on the first output request. The video file input module outputs a second output request in response to a video file, and outputs the video file designating a second transmission destination determined based on a second transmission instruction. The second transmission instruction is supplied based on the second output request. The data transmission module outputs the video data supplied from the encoder to the first transmission destination, and outputs the video file supplied from the video file input module to the second transmission destination. One of the plurality of storage modules is designated as the first or the second transmission destination. The storage module designated as the first transmission destination stores the video data supplied from the data transmission module. The storage module designated as the second transmission destination stores the video file supplied from the data transmission module. The apparatus controller confirms whether or not the number of outputs of video data and a video file to the storage modules within a management time interval is less than a predetermined limitation number in response to the first output request supplied from the encoder or the second output request supplied from the video file input module. The apparatus controller confirms whether or not the number of outputs of video data and a video file to the storage modules within a management time interval is less than a predetermined limitation number in response to the first output request supplied from the encoder or the second output request supplied from the video file input module. The apparatus controller selects a storage module best suited to store the encoded video data from among the plurality of storage modules if the number of outputs is less than the limitation number. The apparatus controller transmits the first transmission instruction to the encoder designating the selected storage module as the first transmission destination. The apparatus controller selects a storage module best suited to store the received video file from among the plurality of storage modules if the number of outputs is less than the limitation number. The apparatus controller transmits the second transmission instruction to the video file input module designating the selected storage module as the second transmission destination.

[First Embodiment]

Hereinafter, an embodiment will be described below with reference to the drawings.

FIG. 1 is a schematic view showing a configuration example of a video transmission system provided with a video server 10 according to this embodiment. The video transmission system shown in FIG. 1 is provided with a video server 10, video camera 20, reproduction deck 30, nonlinear editor 40, operation terminal 50, video confirmation monitor 60, and broadcast facility 70.

The video camera 20 outputs a video signal acquired by shooting to the video server 10.

A video recording medium 31 on which video data or a video file is recorded is inserted in the reproduction deck 30. The video data implies data obtained by encoding a video signal in accordance with a predetermined encoding method set in advance, and video file implies a file obtained by converting the video data into the file format. The reproduction deck 30 reads video data or a video file from the video recording medium 31, converts the read video data or the video file into a video signal, and outputs the video signal to the video server 10.

The nonlinear editor 40 reads a video file accumulated in the video server 10 in accordance with a request from the user. The user edits the read video file by means of the nonlinear editor 40. The nonlinear editor 40 outputs the edited video file to the video server 10.

The operation terminal 50 reads a video file accumulated in the video server 10 in accordance with a request from the user. The operation terminal 50 outputs the read video file to the video server 10 in accordance with an instruction of the user.

The video confirmation monitor 60 receives a video signal output from the video server 10. The video signal is a signal obtained by decoding video data or a video file accumulated in the video server 10. The video confirmation monitor 60 displays the video signal supplied thereto from the video server 10. The user confirms the necessity or the like for edit processing by viewing the display of the video confirmation monitor 60.

The broadcast facility 70 receives a video signal output from the video server 10. The broadcast facility 70 transmits the video signal from the video server 10 to an area to which a broadcast service is to be provided.

FIG. 2 is a block diagram showing the functional configuration of the video server 10 according to this embodiment. The video server 10 shown in FIG. 2 is provided with encoders 11-1 to 11-3, video file input modules 12-1 to 12-3, first data transmission module 13, storage modules 14-1 to 14-3, second data transmission module 15, decoders 16-1 and 16-2, video file output module 17, instruction input module 18, and apparatus controller 19.

The encoder 11-1 receives a video signal supplied thereto from outside. The encoder 11-1 encodes the video signal into video data by using an encoding method set in advance.

Further, upon encoding of the video signal into the video data, the encoder 11-1 outputs a first output request to the apparatus controller 19. When a first transmission instruction for the first output request is received from the apparatus controller 19, the encoder 11-1 designates a transmission destination included in the first transmission instruction. The encoder 11-1 divides the video data into data items each having a preset amount, and outputs the divided data items to the first data transmission module 13. It should be noted the operation of each of the encoders 11-2 and 11-3 is identical to the operation of the encoder 11-1.

The video file input module 12-1 receives a video file supplied from outside. Upon receipt of a video file, the video file input module 12-1 outputs a second output request to the apparatus controller 19. When a second transmission instruction for the second output request is received from the apparatus controller 19, the video file input module 12-1 designates a transmission destination included in the second transmission instruction. The video file input module 12-1 divides the video file into data items each having a preset amount, and outputs the divided data items to the first data transmission module 13. It should be noted the operation of each of the video file input modules 12-2 and 12-3 is identical to the operation of the video file input module 12-1.

The first data transmission module 13 has the configuration using, for example, an Ethernet (registered trade name) switch. The first data transmission module 13 outputs video data output from one of the encoders 11-1 to 11-3 or a video file output from one of the video file input modules 12-1 to 12-3 to a designated transmission destination.

Each of the storage modules 14-1 to 14-3 is designated by each of the encoders 11-1 to 11-3 as a transmission destination of video data. Each of the storage modules 14-1 to 14-3 is designated by each of the video file input modules 12-1 to 12-3 as a transmission destination of a video file. A storage module designated as a transmission destination from among the storage modules 14-1 to 14-3 receives video data or a video file from the first data transmission module 13. FIG. 3 is a block diagram showing the functional configuration of the storage module 14-1 according to this embodiment. It should be noted that the configuration of each of the storage modules 14-2 and 14-3 is identical to the configuration of the storage module 14-1, and hence hereinafter the configuration of the storage module 14-1 will be described.

The storage module 14-1 shown in FIG. 3 is provided with a management controller 141, data input/output module 142, buffer 143, memory controller 144, and storage medium 145.

The management controller 141 controls an operation inside the storage module 14-1 in accordance with a first recording instruction, second recording instruction or read instruction to be described later.

When the first recording instruction for the first output request is received from the apparatus controller 19, the management controller 141 assigns some of a plurality of time slots formed by dividing a management time interval as a first assignment slot. Video data supplied from the first data transmission module 13 may be written to the storage medium 145 at the first assignment slot. The management controller 141 also assigns some of the plurality of time slots as a spare slot. When the writing of video data in the first assignment slot fails because of the occurrence of a writing error, the video data may be written to the storage medium 145 in the spare slot. The management time interval implies, for example, a time interval synchronized with 30 frames/s which is a general display rate used to display an image, and is set to 33 ms. The management controller 141 outputs the first recording instruction to the memory controller 144 in order to write the video data to the storage medium 145 at the first assignment slot.

When the second recording instruction for the second output request is received from the apparatus controller 19, the management controller 141 assigns some of a plurality of time slots as a second assignment slot. Video data supplied from the first data transmission module 13 is transmitted to the storage medium 145 in the second assignment slot. The management controller 141 outputs the second recording instruction to the memory controller 144 in order to write the video file to the storage medium 145 at the second assignment slot.

When the read instruction is received from the apparatus controller 19, the management controller 141 assigns one of the plurality of time slots to a third assignment slot. Video data or a video file may be read from the storage medium 145 at the third assignment slot. The management controller 141 outputs a read instruction to the memory controller 144 in order that the memory controller 144 may read video data or a video file from the storage medium 145 at the third assignment slot.

The management controller 141 carries out output control for the buffer 143 in order that the buffer 143 may output video data or a video file supplied from the data input/output module 142 to the storage medium 145 at the first or second assignment slot. Further, the management controller 141 carries out output control for the buffer 143 in order that the buffer 143 may output video data or a video file read from the storage medium 145 to the data input/output module 142 at the third assignment slot.

The data input/output module 142 outputs video data or a video file supplied thereto from the first data transmission module 13 to the buffer 143.

The data input/output module 142 outputs video data or a video file read from the storage medium 145, and supplied thereto through the buffer 143 to the second data transmission module 15. At this time, the data input/output module 142 designates a transmission destination of the video data or the video file in accordance with an instruction of the management controller 141.

The buffer 143 is constituted of a memory such as a DRAM. The buffer 143 temporarily stores video data or a video file supplied thereto from the data input/output module 142, and video data or a video file read from the storage medium 145. The buffer 143 outputs the stored video data or the video file to the storage medium 145 or the data input/output module 142 in accordance with output control to be carried out by the management controller 141.

The storage medium 145 is provided with a plurality of semiconductor memories such as NAND flash memories. The storage medium 145 writes video data or a video file from the buffer 143 to the semiconductor memory in accordance with a write control signal from the memory controller 144. Further, the storage medium 145 reads video data or a video file stored in the semiconductor memory in accordance with a read control signal from the memory controller 144.

Upon receipt of a first or second recording instruction from the management controller 141, the memory controller 144 designates an address of the semiconductor memory, and outputs a write control signal to the storage medium 145. Further, upon receipt of a read instruction from the management controller 141, the memory controller 144 designates an address of the semiconductor memory at which video data or a video file which is an object of the read instruction is recorded, and outputs a read control signal to the storage medium 145.

The second data transmission module 15 in FIG. 2 has a configuration using the Ethernet switch. The second data transmission module 15 outputs video data or a video file output from any one of the storage modules 14-1 to 14-3 to a designated transmission destination. According to FIG. 2, what is designated as a transmission destination of video data is the decoder 16-1 or the decoder 16-2. On the other hand, what is designated as a transmission destination of a video file is the decoder 16-1, 16-2 or the video file output module 17.

Each of the decoders 16-1 and 16-2 decodes video data or a video file supplied thereto from the second data transmission module 15. Decoding methods of the decoders 16-1 and 16-2 may be identical to each other or different from each other. Each of the decoders 16-1 and 16-2 outputs a decoded video signal to a subsequent stage.

The video file output module 17-1 outputs a video file from the second data transmission module 15 to a subsequent stage.

The instruction input module 18 receives a read request from the user, and outputs the read request to the apparatus controller 19.

For the apparatus controller 19, a limitation number of times within which the video data or the video file can be output to the storage modules 14-1 to 14-3 within the management time interval is determined in advance. When a first output request is received, the apparatus controller 19 confirms the number of times the video data or the video file is output. If the number of times does not exceed the limitation number, the apparatus controller 19 outputs the first transmission instruction to the encoder which has output the first output request. At this time, the apparatus controller 19 selects a storage module in which the residual capacity is the largest, and remaining number of time slots is sufficient from among the storage modules 14-1 to 14-3. The apparatus controller 19 designates the selected storage module as the transmission destination. Further, the apparatus controller 19 outputs a first recording instruction corresponding to the first transmission instruction to the selected storage module.

When the second output request is received, the apparatus controller 19 confirms the number of times the video data or the video file is output. If the number of times does not exceed the limitation number, the apparatus controller 19 outputs the second transmission instruction to the video file input module which has output the second output request. At this time, the apparatus controller 19 selects a storage module in which the residual capacity is the largest, and remaining number of time slots is sufficient from among the storage modules 14-1 to 14-3. The apparatus controller 19 designates the selected storage module as the transmission destination. Further, the apparatus controller 19 outputs a second recording instruction corresponding to the second transmission instruction to the selected storage module.

When a read request is received from the instruction input module 18, the apparatus controller 19 outputs a read instruction to the management controller 141. In the read instruction, a transmission destination selected by the apparatus controller 19 from among the decoders 16-1 and 16-2, and video file output module 17 is designated.

Next, operations to be carried out when video data is recorded in the video server 10 configured as described above, and when video data is read from the video server 10 will be described below in detail.

FIG. 4 is a sequence diagram of a case where the encoder 11-1 transmits video data to the storage module 14-1.

Upon receiving a video signal from outside, the encoder 11-1 encodes the video signal into video data (sequence S41). The encoder 11-1 outputs a first output request to the apparatus controller 19 (sequence S42).

Figure 5:
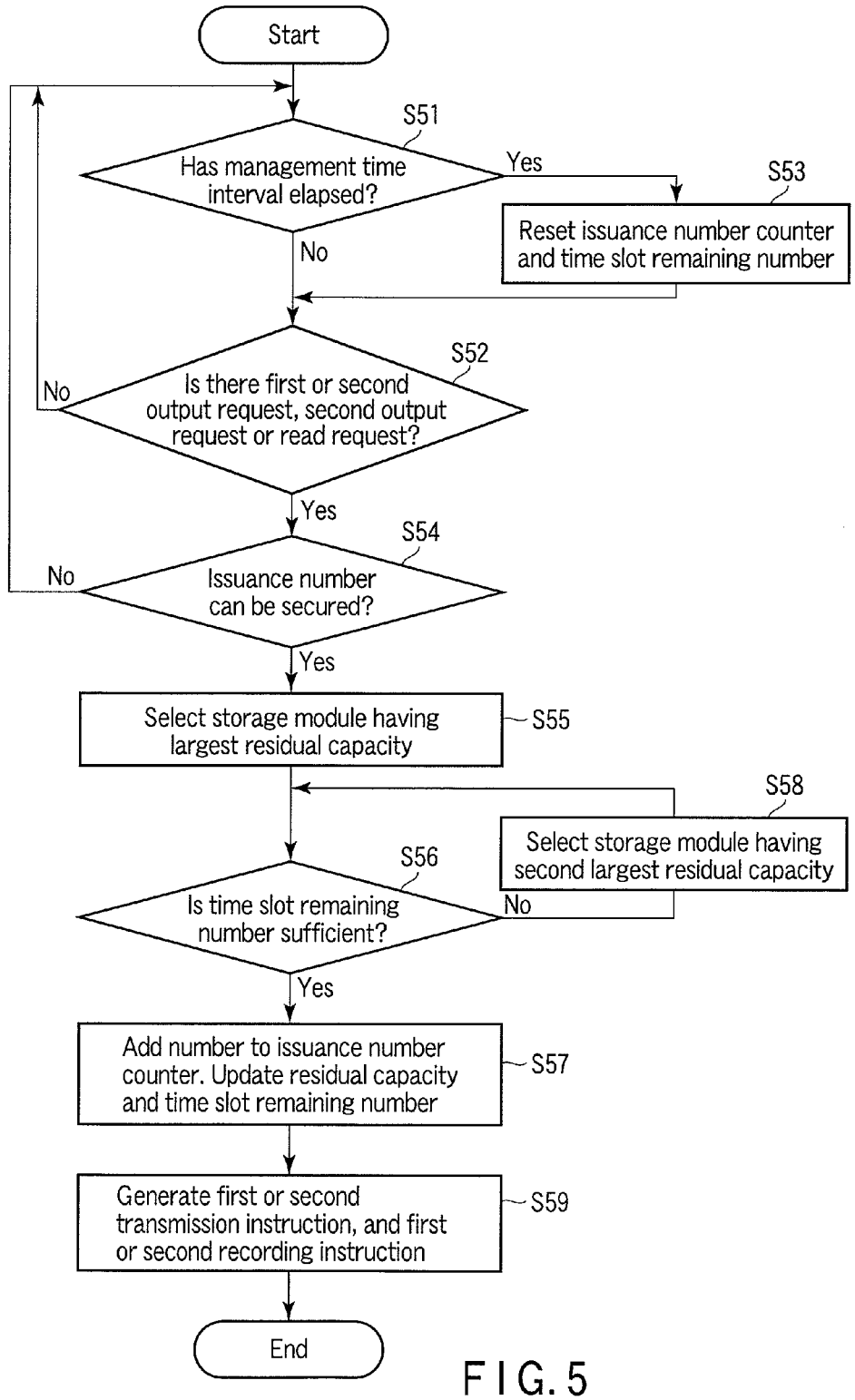
FIG. 5 is a flowchart of a case where the apparatus controller in FIG. 2 generates a first transmission instruction and first recording instruction on the basis of a first output request.

Upon receipt of the first output request, the apparatus controller 19 generates a first transmission instruction and first recording instruction based on the process shown in the flowchart of FIG. 5 (sequence S43).

FIG. 5 shows a flowchart of a case where the apparatus controller 19 generates the first transmission instruction and first recording instruction on the basis of the first output request. It should be noted that in FIG. 5, a case where the first output request is supplied from the encoder 11-1, and storage module 14-1 is selected as the transmission destination will be described as an example. FIG. 6 is an example of an issuance number counter, and shows that the management number has been issued to the path 1 five times. FIG. 7 is an example of a management table indicating the residual capacity and time slot remaining number of each of the storage modules 14-1 to 14-3, and shows that the residual capacity of each of the storage modules 14-1 to 14-3 is 200 MB, 145 MB, and 55 MB, and time slot remaining number is 43, 50, and 50.

First, the apparatus controller 19 determines whether or not the management time interval has elapsed (step S51). When the management time interval has not elapsed yet (No in step S51), the apparatus controller 19 determines whether or not to receive the first output request or second output request (step S52). When the management time has already elapsed (Yes in step S51), the apparatus controller 19 resets the issuance number counter of the management number, and time slot remaining number of each of the storage modules 14-1 to 14-3 (step S53).

In this explanation, as the apparatus controller 19 receives the first output request in step S52 (Yes in step S52), the apparatus controller 19 refers to the issuance number counter to determine whether or not a management number can be issued (step S54). At this time, the issuance number of the management number within the management time interval is limited to the predetermined limitation number of times (in this embodiment, for example, one-hundred times). Accordingly, when the issuance number of the management number exceeds the limitation number of times, the apparatus controller 19 cannot issue a management number. When the apparatus controller 19 receives none of the first output request, second output request, and read request (No in step S52), the processing is shifted to step S51.

In step S54, the issuance number is five times, and is less than one hundred times as shown in FIG. 6, and hence the management number can be issued (Yes in step S54). The apparatus controller 19 refers to the management table shown in FIG. 7, and selects the storage module 14-1 having the largest residual capacity from among the storage modules 14-1 to 14-3 (step S55). It should be noted that when the management number cannot be issued (No in step S54), the apparatus controller 19 shifts the processing to step S51.

After selecting the storage module 14-1, the apparatus controller 19 determines whether or not the time slot remaining number of the storage module 14-1 is sufficient for execution of the required processing (step S56). As will be described later, the time slot remaining number needed to write video data is fourteen. Here, the storage module 14-1 has a sufficient time slot remaining number (Yes in step S56), and hence the apparatus controller 19 sets an issuance number of six to the issuance number counter, and updates the residual capacity and time slot remaining number of the management table (step S57). It should be noted that when there is no sufficient time slot remaining number (No in step S56), the apparatus controller 19 selects the storage module 14-2 having the second largest residual capacity (step S58), and shifts the processing to step S56.

Upon updating the issuance number counter and management table, the apparatus controller 19 outputs a first transmission instruction in which the storage module 14-1 is designated as the transmission destination to the encoder 11-1. Further, the apparatus controller 19 outputs a first recording instruction in which the encoder 11-1 is designated as the transmission source to the storage module 14-1 (step S59), and terminates the processing.

FIG. 8 is a view showing an example of the first transmission instruction and first recording instruction. In FIG. 8, "101" is an identifier indicating the encoder 11-1, and "401" is an identifier indicating the storage module 14-1. The management number is a unique number including the identifier of the storage module 14-1. The classification indicates either a first output in which a minimum value of the transmission rate is preset, or a second output based on the best effort method. In the present embodiment, the first output indicates the output of video data, and the second output indicates the output of a video file. The classification "100" is an identifier indicating the first output.

It should be noted that even when the second output request is received from the video file output module 12-1, the apparatus controller 19 carries out the control shown in FIG. 5, outputs the second transmission instruction in which the storage module 14-1 is designated as the transmission destination to the video file input module 12-1, and outputs the second recording instruction in which the video file input module 12-1 is designated as the transmission source to the storage module 14-1.

In FIG. 4, the first transmission instruction from the apparatus controller 19 is supplied to the encoder 11-1 (sequence S44), and the first recording instruction is supplied to the storage module 14-1 (sequence S45).

Figure 9:
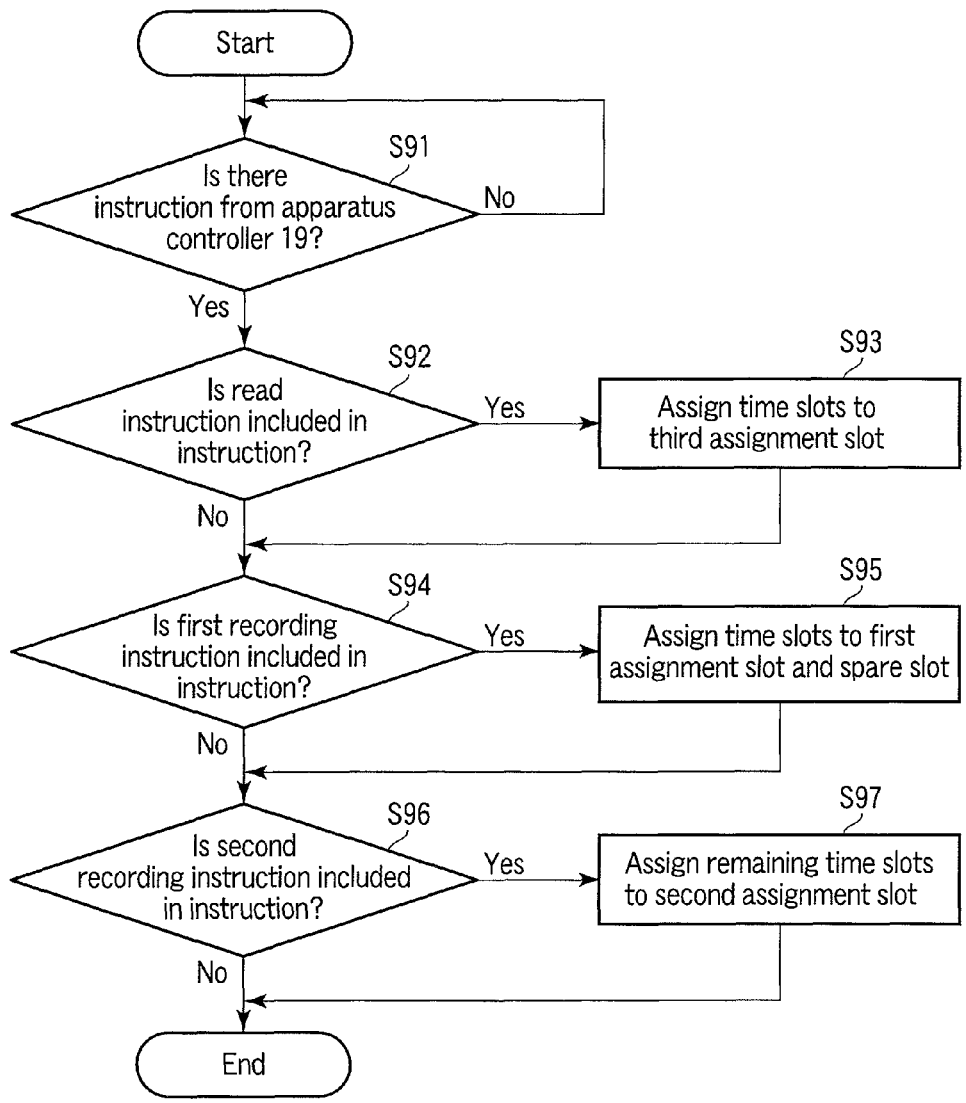
FIG. 9 is a flowchart showing an operation to be carried out by the management controller in FIG. 3 when the management controller receives a first recording instruction, second recording instruction, and read instruction, and assigns a time slot to each instruction.

Upon receiving the first recording instruction, the management controller 141 of the storage module 14-1 assigns time slots based on the process shown in the flowchart of FIG. 9 (sequence S46).

FIG. 9 is a flowchart showing an operation to be carried out by the management controller 141 to assign a time slot to each instruction in the case where the management controller 141 receives the first recording instruction, second recording instruction or the read instruction. Further, FIG. 10 shows a schematic view of a case where the management controller 141 assigns time slots. It should be noted that in this embodiment, the number of time slots provided within the management time interval is, for example, fifty, the number of output channels formed by the decoders 16-1 and 16-2, and video file output module 17 is three, the number of input channels formed by the encoders 11-1 and 11-2 is two, and the number of input channel formed by the video file output module 17 is one.

First, the management controller 141 determines whether or not any instruction is supplied from the apparatus controller 19 (step S91). When an instruction is supplied from the apparatus controller 19 (Yes in step S91), the management controller 141 determines whether or not a read instruction is included in the instruction (step S92). When no instruction is supplied from the apparatus controller 19 (No in step S91), the management controller 141 repeats the processing of step S91 until an instruction from the apparatus controller comes.

In step S92, when the read instruction is included in the instruction (Yes in step S92), the management controller 141 assigns time slots as third assignment slots as shown in FIG. 10 (step S93), and determines whether or not a first recording instruction is included in the instruction (step S94). In this embodiment, the third assignment slot is constituted of one time slot. It should be noted that in FIG. 10, three time slots are assigned as the third assignment slots for three channels.

When the read instruction is not included in the instruction in step S92 (No in step S92), the management controller 141 shifts the processing to step S94.

In step S94, when the first recording instruction is included in the instruction (Yes in step S94), the management controller 141 assigns time slots as first assignment slots and spare slots as shown in FIG. 10 (step S95). In this embodiment, the first assignment slots and spare slots are respectively constituted of seven time slots in conformity with the input rate of the video data. The number of time slots assigned as the first assignment slot or the spare slot is greater than the number of time slots to be assigned as the third assignment slot. This is based on the difference between the write rate and read rate for the semiconductor memory. After assigning time slots for two channels as the first assignment slots and spare slots, the management controller 141 determines whether or not a second recording instruction is included in the instruction (step S96). Further, when the first recording instruction is not included in the instruction (No in step S94), the management controller 141 shifts the processing to step S96.

In step S96, when the second recording instruction is included in the instruction (Yes in step S96), the management controller 141 assigns the remaining time slots as second assignment slots as shown in FIG. 10 (step S97). In this embodiment, two second assignment slots are formed. At this time, the number of time slots assigned as the second assignment slot is seven, identical to that of the first assignment slot. After assigning time slots as the second assignment slots, the management controller 141 terminates the processing. When the second recording instruction is not included in the instruction from the apparatus controller 19 (No in step S96), the management controller 141 terminates the processing.

The encoder 11-1 repeats the processing of sequences S41 to S47, and outputs video data to the storage module 14-1.

FIG. 11 shows a flowchart of a case where the management controller 141 operates in accordance with the time slots.

First, the management controller 141 determines whether or not one time slot has elapsed (step S111). When the time slot has not elapsed yet (No in step S111), the management controller 141 repeats step S111 until the time slot elapses. When the time slot has elapsed (Yes in step S111), the management controller 141 determines whether or not processing is assigned to the time slot next to the elapsed time slot (step S112).

When processing is assigned to the time slot next to the elapsed time slot (Yes in step S112), the management controller 141 controls the data input/output module 142, buffer 143, and memory controller 144 in order to execute the processing assigned to the time slot (step S113). When no processing is assigned to the time slot next to the elapsed time slot (No in step S112), the management controller 141 shifts the processing to step S111.

After carrying out the control shown in step S113, the management controller 141 determines whether or not the processing assigned to the time slot of step S113 is write of video data (step S114). When the processing is write of video data (Yes in step S114), the management controller 141 determines whether or not the write processing of the video data has normally been completed (step S115). When the processing assigned to the time slot is write processing of a video file or read processing of video data or a video file (No in step S114), the management controller 141 outputs a notice to the effect that the write of the video file has been completed or a notice to the effect that the read of the video data or the video file has been completed to the apparatus controller 19 (step S116).

When the write processing of the video data has normally been completed in step S115 (Yes in step S115), the management controller 141 outputs a notice to the effect that the write of the video data has been completed to the apparatus controller 19 (step S117). When the write processing of the video data has failed (No in step S115), the management controller 141 controls the buffer 143 and memory controller 144 to cause the modules 143 and 144 to output again the video data of the failed write processing by using the spare slot (step s118), and shifts the processing to step S117. The management controller 141 repeats steps S111 to S118 for each time slot.

Upon receiving the notice to the effect that the write of the video data or the video file has been completed, the apparatus controller 19 notifies the encoder which has output the video data or the video file input module which has output the video file of the fact.

As described above, in the embodiment described above, the apparatus controller 19 determines whether or not the management number can be issued at intervals of the management time interval, and only when the management number can be issued, the apparatus controller 19 causes the video data from the encoders 11-1 to 11-3 or the video file from the video file input modules 12-1 to 12-3 to be output to the designated storage module. Thereby, even where the video transmission system comprises encoders 11-1 to 11-3 configured to output video data in which a minimum value of the transmission rate is present, and video file input modules 12-1 to 12-3 configured to output a video file based on the best effort, the network is prevented from becoming congested.

Further, in the embodiment described above, the video server 10 includes the storage modules 14-1 to 14-3. Further, the apparatus controller 19 confirms the residual capacity and time slot remaining number of each of the storage modules 14-1 to 14-3 at intervals of the management time interval, and selects a storage module most suitable for storing the video data or the video file as the transmission destination. That is, the apparatus controller 19 selects a storage module in which the residual capacity is the largest, and remaining number of time slots is sufficient from among the storage modules 14-1 to 14-3. Thereby, it becomes possible to store the video data or the video file in the storage modules 14-1 to 14-3 in accordance with the processing ability of the storage modules 14-1 to 14-3.

Further, in the embodiment described above, a plurality of time slots are provided in the management time interval, and read processing of video data or a video file, and write processing of video data or a video file are assigned to the time slots. Thereby, even when video data and video files are present in a mixed state, it becomes possible to smoothly execute the write or read processing.

Further, in the embodiment described above, time slots which correspond in number to the transmission rate of video data are assigned to the first assignment slot and spare slot. Thereby, it is possible to maintain the input rate and write rate of the video data.

Further, in the embodiment described above, spare slots configured to cope with a write error of video data are provided. Write errors occur with a frequency of a certain degree when data is written to a NAND flash memory. Since the spare slots are provided, temporary lowering of the write rate due to the occurrence of a write error can be prevented.

Further, in the embodiment described above, time slots are assigned to the first assignment slot for write processing of video data more preferentially than the second assignment slot for write processing of a video file. In other words, time slots remaining after assignment to the first assignment slots and spare slots are assigned to the second assignment slots. Thereby, the video data output from the encoders at a constant transmission rate can be written, and yet the video file can be transmitted and written in accordance with the remaining processing ability.

Further, in the embodiment described above, time slot is assigned to the third assignment slot configured to read video data or a video file more preferentially than the first assignment slot or the second assignment slot configured to write video data or a video file, respectively. Thereby, it becomes possible for video data or a video file to be stably read.

Therefore, according to the video server associated with this embodiment, even in the case where the general-purpose Ethernet switch is used, it is possible to cope with an environment in which the input/output of a video signal, and input/output of a video file are present in a mixed state without causing congestion of the network, and sufficiently utilize the processing performance of the storage modules.

It should be noted that in the embodiment described above, although the case where when write of the video data has failed, write processing is executed again by using the spare slot in the same management time interval has been described as an example, the case is not limited to the above. For example, write processing of the video data of the failed write may be carried out at the spare slot in the next management time interval. By doing so, it becomes possible, when write processing of video data has not failed in the preceding management time interval, to assign time slots to the second assignment slot in place of the spare slot. Accordingly, it becomes possible to efficiently carry out write processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server comprising:
    an encoder configured to:
        encode a video signal to obtain video data, the video data comprising the encoded video signal,
        output a first output request upon encoding the video signal,
        receive a first transmission instruction from an apparatus controller responsive to the first output request, the first transmission instruction comprising an identity of a first transmission destination, and
        output the video data to the first transmission destination;
    a video file input module configured to:
        output a second output request in response to receiving a video file comprising converted video data that is converted based on a file format,
        receive a second transmission instruction from the apparatus controller responsive to the second output request, the second transmission instruction comprising an identity of a second transmission destination, and
        output the video file to the second transmission destination
    a data transmission module configured to:
        transmit the video data to the first transmission destination, and
        transmit the video file to the second transmission destination;
    a plurality of storage modules; and
    the apparatus controller configured to:
        determine, in response to one of the first output request and the second output request, whether the number of outputs of the video data and the video file to the plurality of storage modules within a management time interval is less than or equal to a limitation number,
        in response to determining that the number of outputs within the management time interval is less than or equal to the limitation number, the apparatus controller is further configured to:
            select a first storage module from the plurality of storage modules based on which storage module has the largest residual capacity available to store the encoded video data, the first storage module configured to store the video data,
            transmit the first transmission instruction to the encoder designating the first storage module as the first transmission destination,
            select a second storage module from the plurality of storage modules based on which storage module has the largest residual capacity available to store the received video file, the second storage module configured to store the video file, and
            transmit the second transmission instruction to the video file input module designating the second storage module as the second transmission destination; and
        in response to determining that the number of outputs within the management time interval is greater than the limitation number, the apparatus controller is further configured to wait until a subsequent management time interval before selecting the first and second storage module, and transmitting the first and second transmission instruction preventing congestion in a network.

2. The video server of claim 1, wherein
    the apparatus controller is further configured to:
        output a first recording instruction to the first transmission destination in response to the first output request supplied by the encoder, and
        output a second recording instruction to the second transmission destination in response to the second output request supplied by the video file input module, and
    the storage module comprises:
        a buffer configured to store at least one of the transmitted video data and the transmitted video file, and to output at least one of the stored video data and the stored video file in response to an output control command,
        a storage medium configured to store the output video data in response to a first storing instruction, and to store the output video file in response to a second storing instruction, and
    a management controller configured to:
        divide the management time interval into a plurality of time slots;
        assign at least some of the plurality of time slots as a first assignment slot,
        output the output control command to the buffer to output the stored video data at the first assignment slot in response to the apparatus controller supplying the first recording instruction,
        output the first storing instruction to the storage medium to store the video data at the first assignment slot in response to the apparatus controller supplying the first recording instruction,
        assign at least some of the plurality of time slots as a second assignment slot,
        output the output the control command to the buffer to output the stored video file at the second assignment slot in response to the apparatus controller supplying the second recording instruction, and
        output the second storing instruction to the storage medium to store the video file at the second assignment slot in response to the apparatus controller supplying the second recording instruction.

3. The video server of claim 1, wherein the apparatus controller selects a storage module with the largest residual capacity among all the plurality of storage modules, and the storage module having sufficient remaining time slots for assignment to at least one of the first and the second assignment slot as one of the first and the second transmission destination.

4. The video server of claim 2, wherein the management controller assigns time slots which correspond in number to a transmission rate of video data to the first assignment slot.

5. The video server of claim 4, wherein after assigning the time slots to the first assignment slot, the management controller assigns the remaining time slots to the second assignment slot.

6. The video server of claim 2, wherein the management controller assigns some of the plurality of time slots to a spare slot during which video data associated with a failed write is rewritten to the storage medium.

7. The video server of claim 6, wherein, in response to the video data failing to be written during the first assignment slot, the management controller rewrites the video data to the storage medium during the spare slot of the same management time interval associated with the first assignment slot.

8. The video server of claim 6, wherein, in response to the video data failing to be written during the first assignment slot, the management controller rewrites the video data to the storage medium during the spare slot of the next management time interval associated with the first assignment slot.

9. The video server of claim 2, wherein
the apparatus controller is further configured to output a read instruction in response to a read request, and
the management controller is further configured to:
assign one of the plurality of time slots as a third assignment slot in response to the read instruction, and
read at least one or the video data and the video file stored in the storage medium during the third assignment slot.

10. The video server of claim 9, wherein the management controller is further configured to give preference to the third assignment slot over the first and second assignment slots in assigning a time slot.

11. A video data transmission method, comprising:
encoding a video signal to obtain video data, the video data comprising the encoded video signal;
generating a first output request upon encoding the video signal;
in response to the first output request, determining whether the number of outputs of the video data and a video file to a plurality of storage modules within a management time interval is less than or equal to a limitation number;
in response to determining that the number of outputs is less than or equal to the limitation number within the management time interval:
selecting a first storage module from the plurality of storage modules to store the encoded video data from the plurality of storage modules based on which storage module includes the largest residual capacity;
generating a first transmission instruction designating the first storage module as a first transmission destination;
outputting the encoded video data to the first transmission destination in response to the first transmission instruction; and
storing the output video data in the first storage module designated as the first transmission destination;
in response to determining that the number of outputs is greater than the limitation number within the management time interval, waiting until a subsequent management time interval before generating the first transmission instruction thereby preventing congestion within a network when the number of outputs exceeds the limitation number;
generating a second output request in response to receiving the video file, the video file comprising video data that is converted based, on a file format;
in response to the second output request, determining whether the number of outputs of the video data and the video file to the plurality of storage modules within the management time interval is less than the limitation number;
in response to determining that the number of outputs is less than or equal to the limitation number within the management time interval:
selecting a second storage module from the plurality of storage modules to store the received video file from the plurality of storage modules based on which storage module includes the largest residual capacity;
generating a second transmission instruction designating the second storage module as a second transmission destination;
outputting the received video file to the second transmission destination in response to the second transmission instruction; and
storing the output video file in the second storage module designated as the second transmission destination; and
in response to determining that the number of outputs is greater than the limitation number within the management time interval, waiting until the subsequent management time interval before generating the second transmission instruction thereby preventing congestion within the network when the number of outputs exceeds the limitation number.

* * * * *